US012642259B2

(12) United States Patent
　　Foil

(10) Patent No.: US 12,642,259 B2
(45) Date of Patent: Jun. 2, 2026

(54) TETHERING SYSTEM AND COMPONENTS THEREOF

(71) Applicant: Yakrods, LLC, Coeur d'Alene, ID (US)

(72) Inventor: Tandi Foil, Post Falls, ID (US)

(73) Assignee: Yakrods, LLC, Coeur d'Alene, ID (US)

( * ) Notice: Subject to any disclaimer, the term of this patent is extended or adjusted under 35 U.S.C. 154(b) by 0 days.

(21) Appl. No.: 19/183,599

(22) Filed: Apr. 18, 2025

(65) Prior Publication Data

US 2025/0241282 A1　　Jul. 31, 2025

Related U.S. Application Data

(63) Continuation of application No. 19/000,401, filed on Dec. 23, 2024.

(60) Provisional application No. 63/616,964, filed on Jan. 2, 2024.

(51) Int. Cl.
　　*A01K 97/10*　　(2006.01)
　　*A01K 87/00*　　(2006.01)
　　*A01K 87/08*　　(2006.01)
(52) U.S. Cl.
　　CPC ............ *A01K 87/008* (2022.02); *A01K 87/08* (2013.01); *A01K 97/10* (2013.01); *Y10T 24/31* (2015.01); *Y10T 24/32* (2015.01)
(58) Field of Classification Search
　　CPC ...... A01K 87/008; A01K 97/10; A01K 87/08; A44D 2203/00; A41F 1/002; Y10T 24/32; Y10T 24/31; Y10T 24/314; Y10T 24/316; Y10T 24/318

USPC ....... 43/25, 21.2, 23; 24/303, 298, 300, 301, 24/302; 63/900
See application file for complete search history.

(56) References Cited

U.S. PATENT DOCUMENTS

| | | | | |
|---|---|---|---|---|
| 1,493,479 A | * | 5/1924 | Deatrick ................ | A01K 1/064 24/603 |
| 2,469,978 A | * | 5/1949 | Mrozinski .............. | A01K 97/14 242/379.2 |
| 2,645,050 A | * | 7/1953 | Golias .................... | A01K 97/10 43/17 |

(Continued)

FOREIGN PATENT DOCUMENTS

| | | | | |
|---|---|---|---|---|
| CN | 87210809 U | * | 4/1988 | |
| CN | 205695140 U | * | 11/2016 | |

(Continued)

OTHER PUBLICATIONS

International Search Report and Written Opinion for International Application No. PCT/US2024/061969, dated Apr. 23, 2025, 13 pages.

*Primary Examiner* — Darren W Ark
(74) *Attorney, Agent, or Firm* — Lee & Hayes, P.C.

(57)　　　　　ABSTRACT

A magnetic tethering apparatus includes an end cap. The end cap includes an opening at a first end of the end cap, an outer wall extending from the first end to a second end of the end cap in a first direction, a first mounting surface at the second end of the end cap configured to engage with a second mounting surface, an inner wall extending from the second end of the end cap towards the opening in a second direction, and a base wall surface at the first end extending radially from the inner wall to the outer wall in a third direction transverse to the first direction.

9 Claims, 13 Drawing Sheets

(56) References Cited

U.S. PATENT DOCUMENTS

| 2,692,106 | A | * | 10/1954 | Hermann | A01K 97/10 |
| | | | | | 248/314 |
| 2,893,158 | A | * | 7/1959 | Haber | A01K 87/04 |
| | | | | | 24/303 |
| 2,900,153 | A | * | 8/1959 | Lazur | A01K 97/10 |
| | | | | | 248/408 |
| 3,041,697 | A | * | 7/1962 | Budreck | A44B 15/002 |
| | | | | | 24/303 |
| 3,086,268 | A | * | 4/1963 | Chaffin, Jr. | A44B 15/002 |
| | | | | | 70/459 |
| 3,095,663 | A | * | 7/1963 | Miller | A01K 97/10 |
| | | | | | 43/21.2 |
| 3,154,274 | A | * | 10/1964 | Hillcourt | A01K 97/10 |
| | | | | | 248/538 |
| 3,470,648 | A | * | 10/1969 | Bowker | A01K 97/10 |
| | | | | | 248/538 |
| 3,851,916 | A | * | 12/1974 | Quartullo | A01K 97/22 |
| | | | | | 297/188.21 |
| 4,031,652 | A | * | 6/1977 | Johnson | A01K 91/08 |
| | | | | | 43/43.12 |
| 4,702,031 | A | * | 10/1987 | Sousa | A01K 97/12 |
| | | | | | 43/17 |
| 4,759,963 | A | * | 7/1988 | Uso, Jr. | A01K 97/08 |
| | | | | | 24/17 AP |
| 5,237,769 | A | * | 8/1993 | Navarro | A01K 97/10 |
| | | | | | 43/25 |
| 5,432,986 | A | * | 7/1995 | Sexton | A44C 5/2071 |
| | | | | | 24/303 |
| 5,511,293 | A | * | 4/1996 | Hubbard, Jr. | A44B 11/04 |
| | | | | | 43/25 |
| 5,564,217 | A | * | 10/1996 | Riedell | A01K 97/10 |
| | | | | | 43/21.2 |
| 5,662,251 | A | * | 9/1997 | Rossiter | A01K 97/10 |
| | | | | | 43/21.2 |
| 5,815,977 | A | * | 10/1998 | Hill, Jr. | A01K 87/00 |
| | | | | | 43/25 |
| D405,152 | S | * | 2/1999 | Grant | D22/139 |
| 5,910,004 | A | * | 6/1999 | Antosh | A01K 87/08 |
| | | | | | 224/267 |
| 6,182,336 | B1 | * | 2/2001 | Bauer | A41F 1/002 |
| | | | | | 24/66.1 |
| 6,216,319 | B1 | * | 4/2001 | Elkins | A45F 5/00 |
| | | | | | 224/904 |
| 6,247,427 | B1 | * | 6/2001 | DeBien | A01K 27/005 |
| | | | | | 119/776 |
| 6,499,437 | B1 | * | 12/2002 | Sorensen | A01K 27/005 |
| | | | | | 119/769 |
| 6,584,724 | B1 | * | 7/2003 | Le Blanc | A01K 77/00 |
| | | | | | 43/11 |
| 7,162,978 | B2 | * | 1/2007 | Debien | A01K 27/005 |
| | | | | | 119/772 |
| 7,322,146 | B1 | * | 1/2008 | Baldwin | A01K 77/00 |
| | | | | | 24/303 |
| 7,360,334 | B2 | * | 4/2008 | Christiansen | A01K 77/00 |
| | | | | | 224/183 |

| 7,389,750 | B1 | * | 6/2008 | Rogers | A01K 27/005 |
| | | | | | 119/792 |
| 8,291,635 | B2 | * | 10/2012 | Payne | A01K 91/10 |
| | | | | | 43/16 |
| 9,220,252 | B1 | * | 12/2015 | Arcabascio | A01K 97/10 |
| 9,314,001 | B2 | * | 4/2016 | Siwak | A01K 27/005 |
| 9,402,381 | B1 | * | 8/2016 | Craddock | A01K 99/00 |
| 9,635,846 | B2 | * | 5/2017 | Bargman | A01K 99/00 |
| 11,432,606 | B1 | * | 9/2022 | Reiter | A44B 17/0041 |
| 11,445,713 | B2 | * | 9/2022 | Truitt | A01K 97/08 |
| 11,470,923 | B1 | * | 10/2022 | Nikolla | A44B 99/005 |
| 11,719,268 | B2 | * | 8/2023 | Glozbach De Cabarrus |
| | | | | | F16B 7/04 |
| | | | | | 24/303 |
| 2001/0037774 | A1 | * | 11/2001 | De Bien | A01K 27/005 |
| | | | | | 119/776 |
| 2004/0107625 | A1 | * | 6/2004 | Rienzo | A01K 97/10 |
| | | | | | 43/21.2 |
| 2005/0172534 | A1 | * | 8/2005 | Arcabascio | A01K 91/08 |
| | | | | | 43/21.2 |
| 2006/0032460 | A1 | * | 2/2006 | Hurwitz | A44C 15/0015 |
| | | | | | 119/795 |
| 2006/0213455 | A1 | * | 9/2006 | Bien | A01K 27/005 |
| | | | | | 119/772 |
| 2007/0266616 | A1 | * | 11/2007 | Rienzo | A01K 97/10 |
| | | | | | 114/364 |
| 2012/0311914 | A1 | * | 12/2012 | Appel | A01K 97/10 |
| | | | | | 43/4.5 |
| 2014/0110363 | A1 | * | 4/2014 | Brown | E05B 65/00 |
| | | | | | 70/58 |
| 2015/0313324 | A1 | * | 11/2015 | Bansod | A44B 99/00 |
| | | | | | 24/303 |
| 2016/0000189 | A1 | * | 1/2016 | Bolen | A44B 1/30 |
| | | | | | 24/303 |
| 2016/0066545 | A1 | * | 3/2016 | DeBien | A01K 27/004 |
| | | | | | 119/796 |
| 2016/0309820 | A1 | * | 10/2016 | Bolen | A44B 1/185 |
| 2016/0338333 | A1 | * | 11/2016 | Bargman | F16M 13/04 |
| 2016/0369521 | A1 | * | 12/2016 | Eldridge | A01K 97/10 |
| 2018/0255758 | A1 | * | 9/2018 | Mazzitelli | A01K 97/10 |
| 2019/0017535 | A1 | * | 1/2019 | Ormsbee | F16B 1/00 |
| 2021/0144985 | A1 | * | 5/2021 | Huang | A01K 97/10 |
| 2022/0201999 | A1 | * | 6/2022 | Truitt | A01K 97/10 |
| 2023/0015639 | A1 | * | 1/2023 | Truitt | A01K 97/10 |
| 2025/0212859 | A1 | * | 7/2025 | Foil | A01K 87/007 |

FOREIGN PATENT DOCUMENTS

| CN | 211020621 | U | * | 7/2020 | |
| CN | 211510311 | U | * | 9/2020 | |
| EP | 3632205 | A1 | * | 4/2020 | A01K 97/10 |
| GB | 2341071 | A | * | 3/2000 | A01K 97/10 |
| JP | 2008035725 | A | * | 2/2008 | |
| KR | 200418294 | Y1 | * | 6/2006 | A01K 87/007 |
| KR | 101506248 | B1 | * | 3/2015 | A01K 97/10 |
| KR | 20150002885 | U | * | 7/2015 | A01K 87/007 |
| KR | 20200022711 | A | * | 3/2020 | H01F 7/00 |
| KR | 102172402 | B1 | * | 10/2020 | H01F 7/00 |
| KR | 20220002189 | A | * | 1/2022 | A01K 97/10 |

* cited by examiner

FIG. 3

TETHERING SYSTEM AND COMPONENTS THEREOF

CROSS REFERENCE TO RELATED PATENT APPLICATIONS

This application is a continuation of and claims priority from U.S. application Ser. No. 19/000,401, filed Dec. 23, 2024, which claims priority from U.S. Provisional Patent Application No. 63/616,964, filed on Jan. 2, 2024, which are incorporated in their entireties by reference.

BACKGROUND

For as long as there have been fishing rods, there has been a risk of dropping and losing fishing rods. The cost of having to replace such lost fishing rods and the components and accessories attached to fishing rods is frustrating and can be very expensive.

In order to mitigate the risk of losing a fishing rod, some anglers attach a Velcro™ strap to the grip or attach a spring-loaded clip to the reel of the fishing rod and attach the opposite end of the leash to a fixed point either on their clothing, their body, or another object out of the water. With the leash attached, should the fishing rod be dropped in the water, the angler need only pull the leash to recover the dropped fishing rod. These solutions, however, are not ideal.

Any strap connected to the grip inhibits the angler's ability to utilize the portion of the grip being covered by the strap and negatively affects the comfort of the rod. Additionally, the repeated action of attaching and detaching the leash may cause the attaching mechanism to wear out and eventually fail. The failure of the attaching mechanism due to wear may also be accelerated due to the conditions inherently present while fishing (i.e., direct sunlight, extreme temperatures, wetting and re-wetting, exposure to salt water and/or freshwater, etc.). Also, any clip attached to the reel (or other fishing rod component) may result in potentially catastrophic damage to the reel when pulling the leash.

BRIEF DESCRIPTION OF THE DRAWINGS

FIG. 3 illustrates a top front view of a rod end cap, according to an embodiment of this disclosure.

DETAILED DESCRIPTION

The Detailed Description is set forth with reference to the accompanying figures. In the figures, the left-most digit(s) of a reference number identifies the figure in which the reference number first appears. The use of the same reference numbers in different figures indicates similar or identical items. Furthermore, the drawings may be considered as providing an approximate depiction of the relative sizes of the individual components within individual figures. However, the drawings are not to scale, and the relative sizes of the individual components, both within individual figures and between the different figures, may vary from what is depicted. In particular, some of the figures may depict components as a certain size or shape, while other figures may depict the same components on a larger scale or differently shaped for the sake of clarity.

This disclosure relates to a tethering system for a fishing rod that attaches to the end of the fishing rod grip, and which on an opposite end attaches releasably to an anchor point, such as an angler, user, dock, boat, kayak, floating apparatus, etc. The disclosed tethering system may be a first manufacture system, or it may be retrofitted with an existing fishing rod. More specifically, in an embodiment, this disclosure may include a magnetic tethering system and components. By using a magnetic tethering system that attaches to the end of the fishing rod, the angler may more comfortably utilize the entirety of the fishing rod grip and maintain the ability of the angler to recover a dropped fishing rod while minimizing the risk of damage without causing excessive wear and tear on the tethering system. Additionally, another advantage of the magnetic tethering system disclosed herein is that an angler may tether a different fishing rod more quickly than any other tethering system. Additionally, in an embodiment, this disclosure may include a mechanical coupling tethering system and components, which may or may not include a magnetic force to couple simultaneously.

Figure 1:
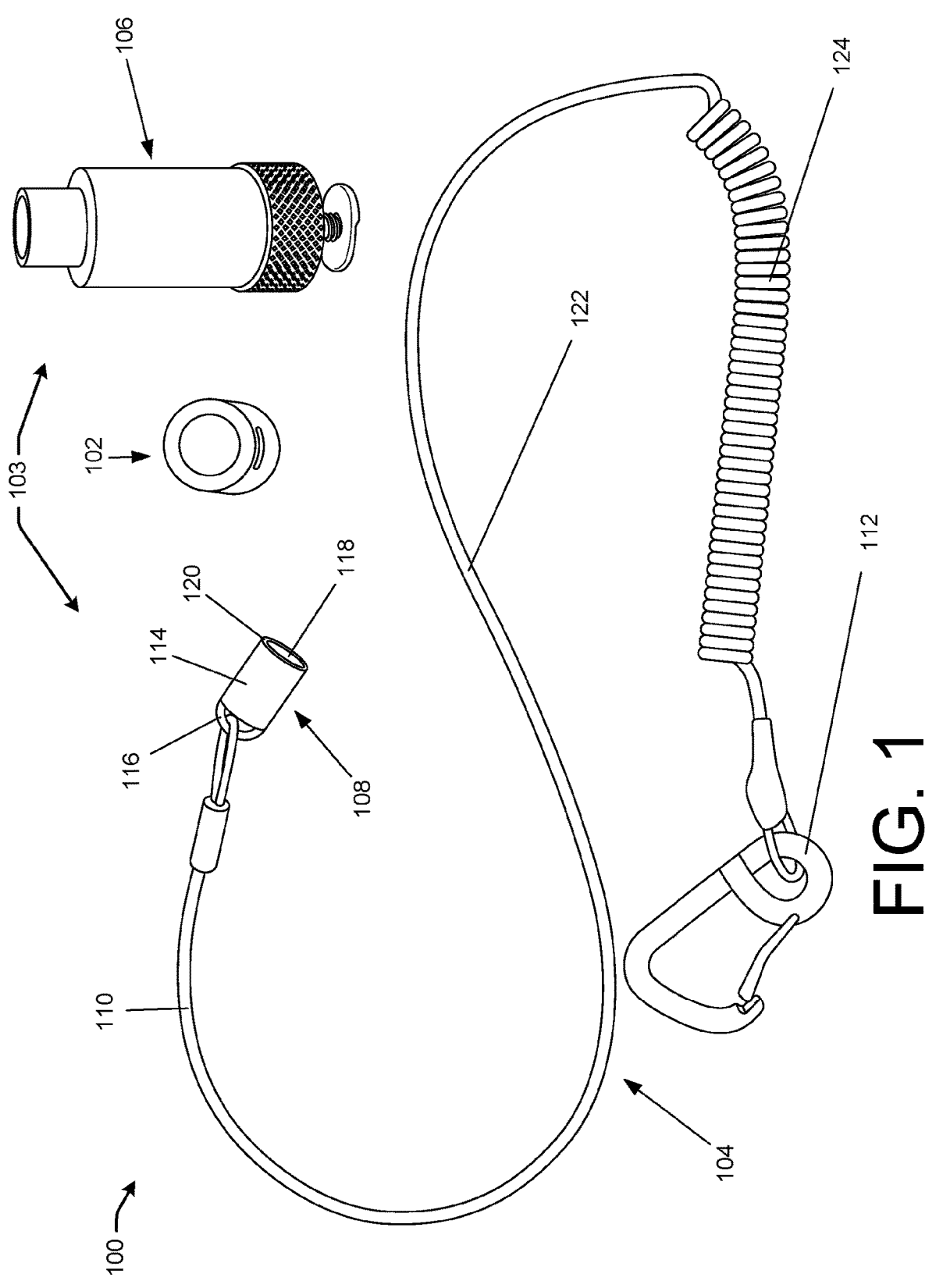
FIG. 1 illustrates a side view of an integrated magnetic rod-tethering system, according to an embodiment of this disclosure.

Turning to the drawings, FIG. 1 illustrates an integrated magnetic rod-tethering system 100 ("system 100"), according to an embodiment of this disclosure. In an embodiment, the system 100 may include an end cap 102 and an anchor mechanism 103. In an embodiment, the anchor mechanism 103 may be a tether 104. In an embodiment, the anchor mechanism 103 may be an anchor 106. In an embodiment, the tether 104 may include a plug 108, a cable 110, and a clip 112. In an embodiment, the clip 112 may be a tether clip, trigger clip, carabiner clip, or other suitable device.

In an embodiment, the plug 108 may include a body 114 having a cylindrical shape with a loop 116 at a back end (i.e., first end, top end, etc.) and a mating surface 118 at a front end (i.e., second end, bottom end, etc.). In an embodiment, the body 114 and loop 116 may have a coating 120 surrounding the outer surfaces of the body 114 and the loop 116. It is understood that the coating 120 may have one or more colors and/or textures. It is also understood that the coating 120 may be made of plastic, nylon, rubber, or other suitable material or combination of materials.

In an embodiment, the body 114 may be solid. In an embodiment, the body 114 may include an internal cavity. In an embodiment, the body 114 may be constructed of a magnet (e.g., a natural magnet, neodymium, alnico, etc.). In an embodiment, the body 114 may be constructed of a ferromagnetic material (e.g., iron, steel, nickel, cobalt, magnetite, etc.).

Figure 2A:
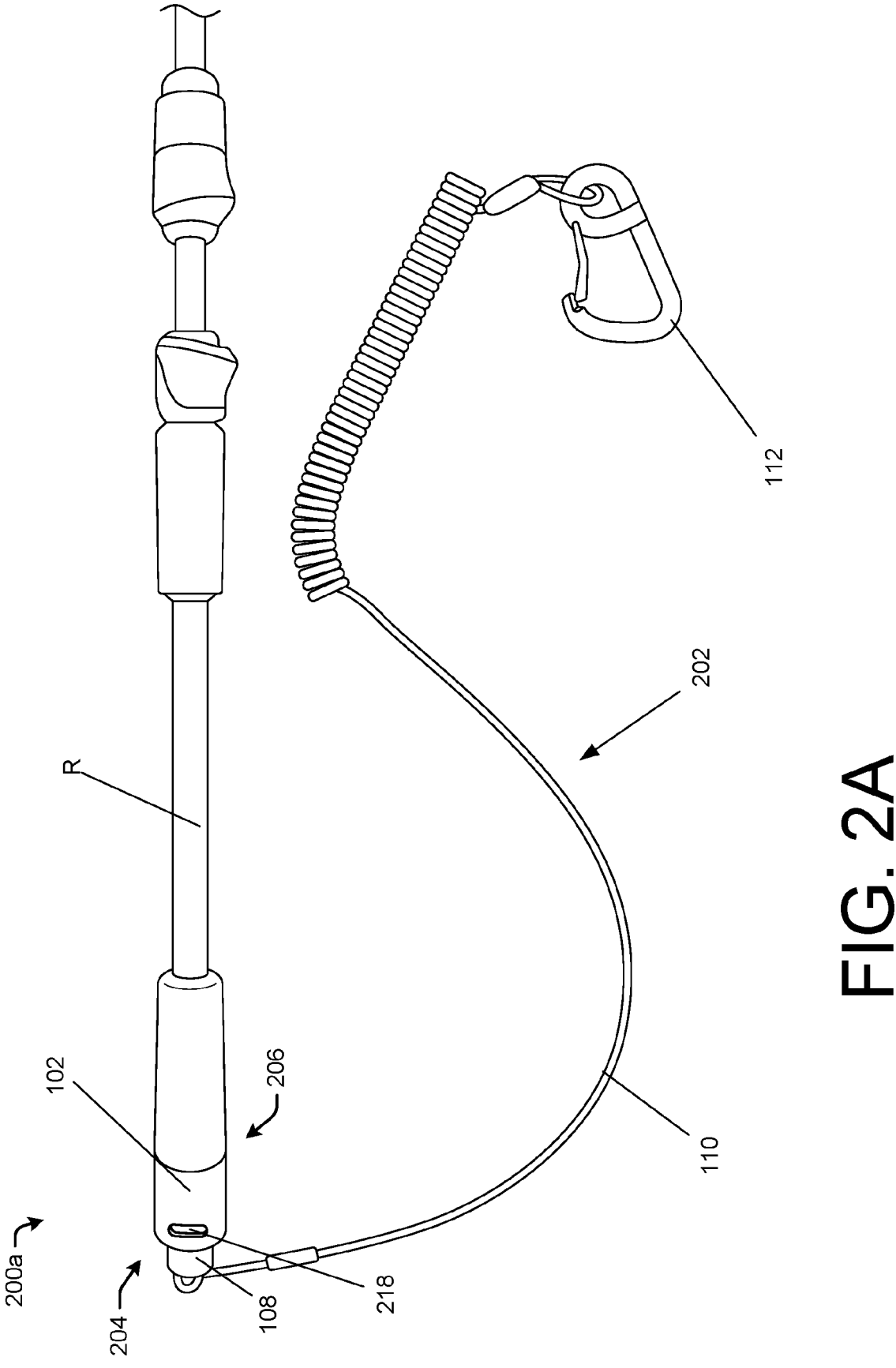
FIG. 2A illustrates a side view of a magnetic rod-tethering system installed on a fishing rod, according to an embodiment of this disclosure.

FIG. 2A illustrates a magnetic rod-tethering system 200a ("system 200a") installed on a fishing rod R. It is understood that the system 200a may be installed on any type of fishing rod (e.g., spinning rod, casting rod, fly rod, trolling rod, surf rod, etc.). In an embodiment, the system 200a may include the end cap 102 and a magnetic tether 202. In an embodiment, the magnetic tether 202 may include the plug 108, the cable 110, and the clip 112.

In an embodiment, the end cap 102 (or 300 in FIGS. 3 and 4) may be installed on the fishing rod R during manufacture. In an embodiment, the end cap 102 may be installed on the fishing rod R post-manufacture (e.g., universal end cap, etc.) (not shown, see FIGS. 5 and 6). The end cap 102 may be attached to an end of the fishing rod R and may be configured to receive the plug 108 of the magnetic tether 202. In an embodiment, the magnetic tether 202 may include the plug 108, the cable 110, and the clip 112.

The end cap 102 may have a back end (e.g., first end, top end, etc.) 204 and a front end (e.g., second end, bottom end, etc.) 206. The back end 204 of the end cap 102 may be configured to receive a portion of the plug 108. The front end 206 of the end cap may be configured to receive a portion of the fishing rod R. In an embodiment, the end cap 102 may be attached to the fishing rod R via friction (i.e., press-fit, etc.), chemical bonding agents (e.g., epoxy, glue, etc.), a mechanical method (e.g., fastener, rivet, etc.), or a combination thereof. In an embodiment, a portion of the fishing rod R may be inserted into the front end 206 of the end cap 102 and a chemical bonding agent (e.g., epoxy) may be used to couple the end cap 102 onto the fishing rod R. In an embodiment, the end cap 102 may be attached to the fishing rod R via a fastener (not shown in FIG. 2A, see FIG. 7) and a washer (not shown in FIG. 2A, see FIG. 7).

In an embodiment, the back end 204 of the end cap 102 may be configured to receive a portion of the plug 108. In an embodiment, the plug 108 may magnetically couple to a portion of the end cap 102. In an embodiment, a portion of the plug 108 may be a magnet (e.g., first magnet, tether magnet, etc.). In an embodiment, a portion of the end cap 102 may be a magnet (e.g., second magnet, end cap magnet, etc.). In an embodiment, the magnetic tether 202 may couple with the end cap 102 via a magnetic force (e.g., approximately 12-16 pounds) between the plug 108 and a portion of the end cap 102. It is understood that the magnetic tether 202 and the end cap 102 may be de-coupled by overcoming the magnetic force between the magnetic tether 202 and the end cap 102 (e.g., pulling the magnetic tether 202 and the end cap 102 apart).

Figure 2B:
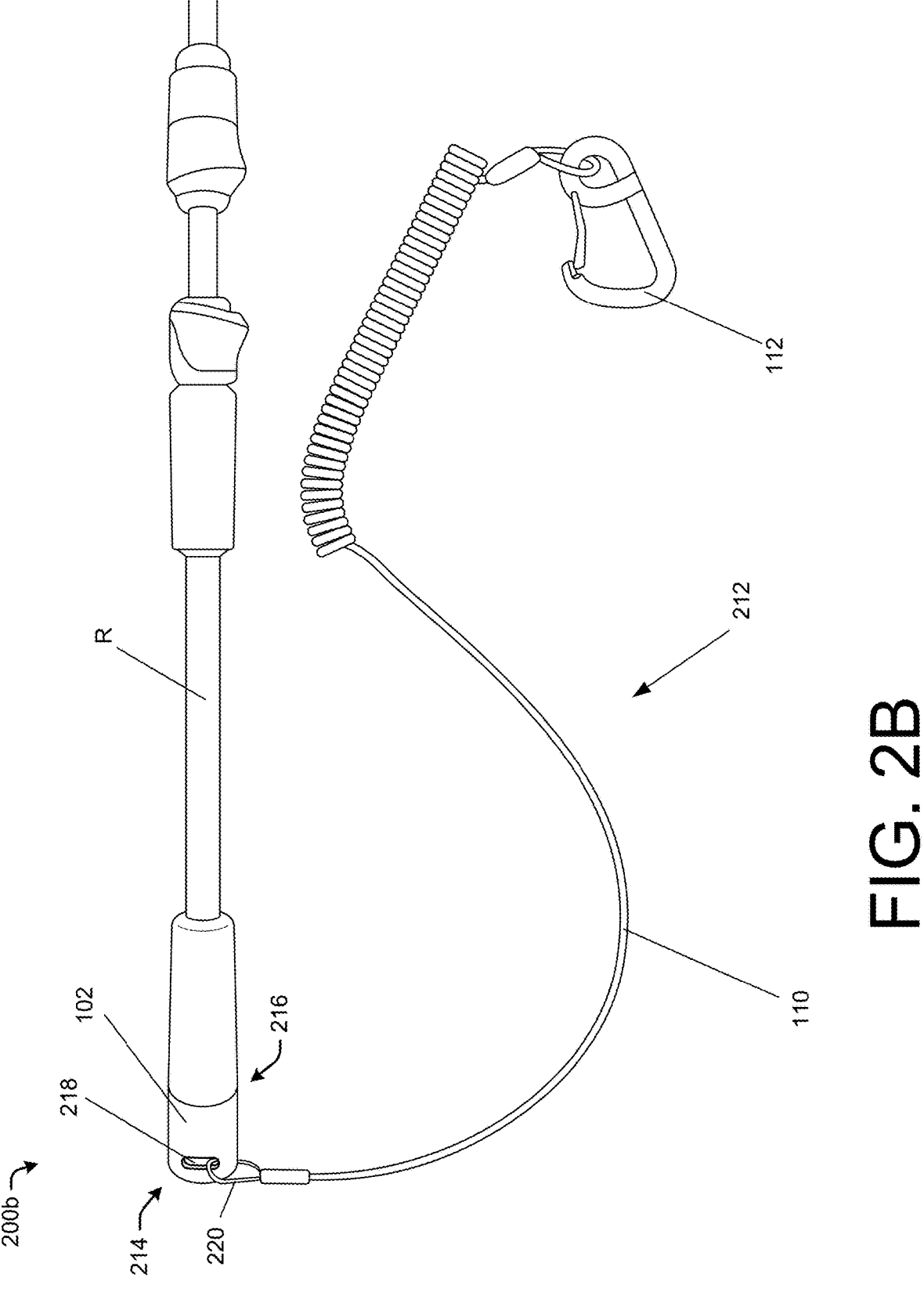
FIG. 2B illustrates a side view of a rod-tethering system installed on a fishing rod, according to an embodiment of this disclosure.

FIG. 2B illustrates a side view of a rod-tethering system 200b installed on a fishing rod R, according to an embodiment of this disclosure. It is understood that the system 200b may be installed on any type of fishing rod (e.g., spinning rod, casting rod, fly rod, trolling rod, surf rod, etc.). In an embodiment, the system 200b may include the end cap 102 and a tether 212. In an embodiment, the tether 212 may include the cable 110, and the clip 112.

Figure 3:
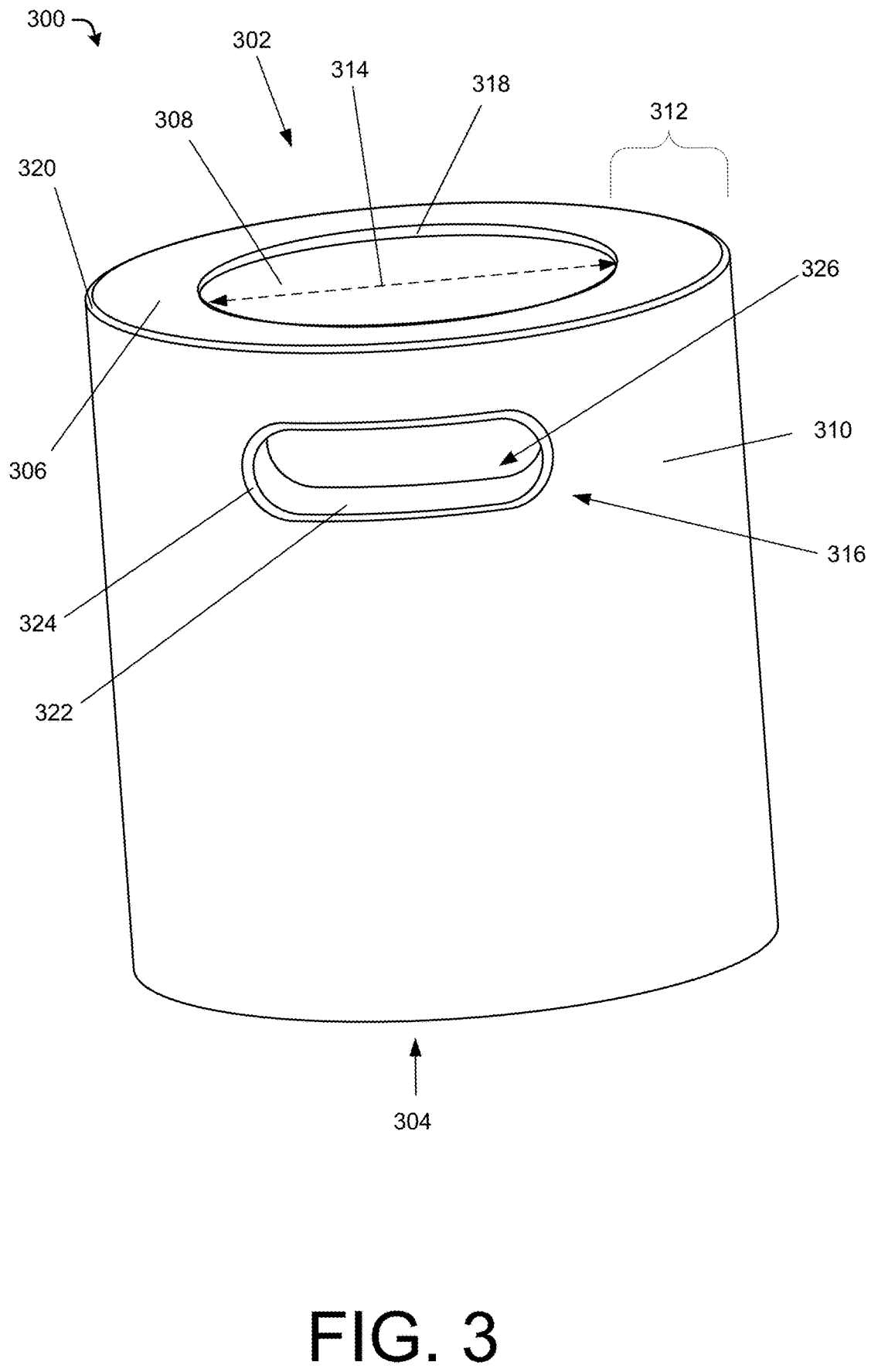
Figure 4:
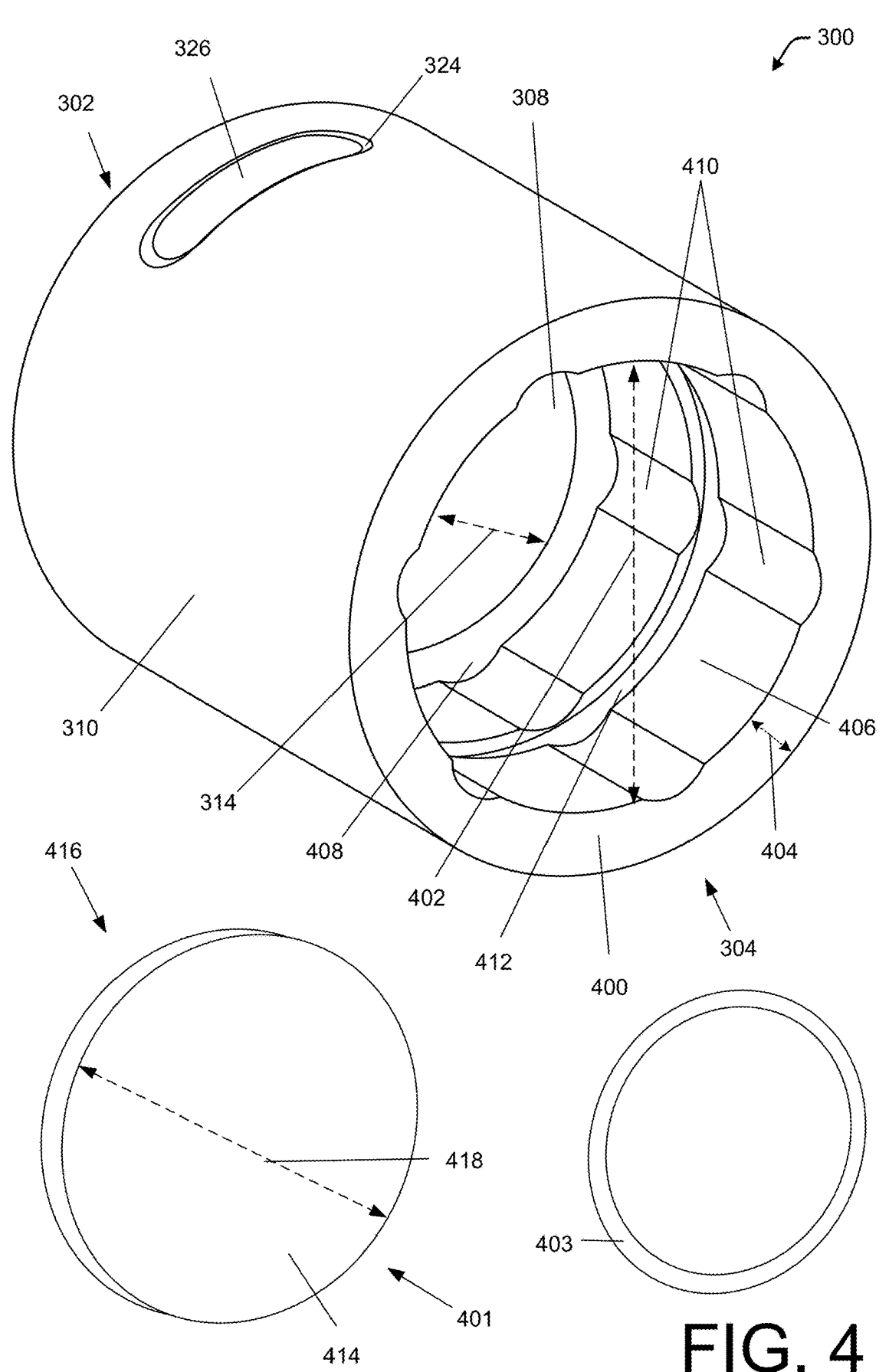
FIG. 4 illustrates a bottom side view of a rod end cap, according to an embodiment of this disclosure.

In an embodiment, the end cap 102 may be installed on the fishing rod R during manufacture (e.g., end cap 300, in FIGS. 3 and 4). In an embodiment, the end cap 102 may be installed on the fishing rod R post-manufacture (e.g., universal end cap, etc.) (not shown, see FIGS. 5 and 6). The end cap 102 may be attached to an end of the fishing rod R and may be configured to receive the tether 212.

The end cap 102 may have a back end (e.g., first end, top end, etc.) 214 and a front end (e.g., second end, bottom end, etc.) 216. The back end 214 of the end cap 102 may be configured to receive a portion of the tether 212. The end cap 102 of system 200b may be the same or similar to the end cap 102 of system 200a. Likewise, the end cap 102 of system 200b may be attached to the fishing rod R using the same methods as those described with respect to system 200a. In an embodiment, the end cap 102 may include a slot (e.g., cut-out, void, slit, etc.) 218 near the back end 214. In an embodiment, the slot 218 may be configured to receive a portion of the tether 212. For example, a portion of the tether 212 may be a capture device (e.g., loop, clip, etc.) 220 that ensnares the end cap 102 via the slot 218.

FIG. 3 illustrates a top front view of rod end cap 300 (which may be used as end cap 102, for example), according to an embodiment of this disclosure. In an embodiment, the body of the end cap 300 may be cylindrical and have a cavity (hollow portion) therein. However, it is considered that the outermost shape may be a geometrical shape other than cylindrical, (e.g., hexagonal, pentagonal, etc.). In an embodiment, the rod end cap 300 may include a disc 401 (not shown in FIG. 3, see FIG. 4). In an embodiment, rod end cap 300 may be installed on a rod (e.g., fishing rod, etc.) at the time of manufacture. The end cap 300 may be secured to the rod via friction (i.e., press-fit, etc.), chemical bonding (e.g., epoxy, glue, or other adhesive, etc.), or both.

The end cap 300 may have a top end 302 (e.g., first end, back end, tether end, etc.) and a bottom end (e.g., second end, front end, rod end, etc.) 304 that is opposite the top end 302. In an embodiment, the disc 401 may be installed in the bottom end 304 of the end cap 300 (i.e., the disc 401 may be inserted in the bottom end 304 of the end cap 300 before the end cap 300 is installed on a fishing rod). The end cap 300 may include a top surface 306 at the top end 302. A length of the end cap 300 extends from the top end 302 to the bottom end 304. The end cap 300 includes an inner wall 308 (e.g., first inner wall, upper inner wall, etc.) and an outer wall 310 thereby defining a sidewall 312, which may vary in thickness The end cap 300 may have an opening 314 (e.g., top opening, main opening, etc.) through the top surface 306 that opens in the interior cavity of the end cap 300. In an embodiment, the opening 314 may be sized to receive a portion of a magnetic tether (e.g., the plug 108 of the magnetic tether 202, not shown in FIG. 3, see FIG. 2A). The opening 314 may also be sized to receive a portion of the anchor 106. In an embodiment, the end cap 300 may include a slot 316 that extends through the outer wall 310 and the inner wall 308 (i.e., the depth of slot 316 is the same as the wall thickness 312).

In an embodiment, the inner wall 308 may extend from the bottom end 304 to the top surface 306 at the top end 302. In an embodiment, the inner wall 308 may join with the top surface 306 at inner edge 318. In an embodiment, the inner edge 318 may be an angular transition between the inner wall 308 and the top surface 306. For example, the inner edge 318 may be rounded, chamfered, beveled, etc.

In an embodiment, the outer wall 310 may extend from the bottom end 304 to the top surface 306 at the top end 302. In an embodiment, the outer wall 310 may join with the top surface at outer edge 320. In an embodiment, the outer edge 320 may be an angular transition between the outer wall 310 and the top surface 306. For example, the outer edge 320 may be rounded, chamfered, beveled, etc.

In an embodiment, the slot 316 may include an inner wall 322 and an outer edge 324. The inner wall 322 of the slot 316 may extend between the inner wall 308 of the end cap 300 and the outer wall 310 of the end cap 300, so as to open to the interior cavity of the end cap 300. In an embodiment, the inner wall 322 of the slot 316 may join with the outer wall 310 at the outer edge 324 of the slot 316. In an embodiment, the outer edge 324 of the slot 316 may be an angular transition between the inner wall 322 of the slot 316 and the outer wall 310. For example, the outer edge 324 may be rounded, chamfered, beveled, etc.

Additionally, the inner wall 322 of the slot 316 may join with the inner wall 308 at the inner edge 326 (note that the location of inner edge 326 is identified, but inner edge 326 is not specifically shown) of the slot 316. In an embodiment, the inner edge 326 of the slot 316 may be an angular transition between the inner wall 322 of the slot 316 and the inner wall 308 of the end cap 300. For example, the inner edge 326 may be rounded, chamfered, beveled, etc.

FIG. 4 illustrates a bottom side view of the end cap 300 from FIG. 3 and a side-front view of a disc 401 and O-ring 403, according to an embodiment of this disclosure. In an embodiment, the end cap 300 may include a bottom surface 400 (e.g., second surface, rod-mounting surface, etc.) 400. In an embodiment, the end cap 300 may have an opening 402 (e.g., bottom opening, second opening, etc.) through the bottom surface 400. In an embodiment, the opening 402 may be sized to receive a portion of a rod (e.g., fishing rod, casting rod, spinning rod, etc.) and may be sized to accommodate the disc 401. The bottom surface 400 may extend from the outer wall 310 to the opening 402. The bottom surface 400 may have a wall thickness 404. In an embodiment, the wall thickness 404 may be less than the wall thickness 312. In an embodiment, the opening 314 may have a diameter smaller than the opening 402.

In an embodiment, the end cap 300 may have an inner wall 406 (e.g., second inner wall, lower inner wall, etc.). In an embodiment, the inner wall 406 may extend from the bottom surface 400 to a disc mating surface 408 (e.g., base wall, inner protrusion, seat, inwardly extending member-radially or no-radially, etc.), which extends transversely to the direction of extension of the length (and inner walls 308, 406 and outer wall 310 of the end cap. That is, the disc 401 may be placed with the cavity of the end cap 300, abutting the disc mating surface 408 which is formed via the difference in the diameters of the opening 314 and opening 402. The disc mating surface 408 may extend from the inner wall 406 to the inner wall 308. The inner wall 406 may extend from the bottom surface 400 to the disc mating surface 408. The disc mating surface 408 may be configured to planarly engage with the disc 401.

In an embodiment, the inner wall 406 may include one or more groove(s) 410 that extend along a portion (or more) of the length of the inner wall 406 (i.e., the groove(s) 410 may extend from the bottom surface 400 to the disc mating surface 408). In an embodiment, the groove(s) 410 may be separated radially, located along the inner wall 406. In an embodiment, the inner wall 406 may include a channel 412.

In an embodiment, the disc 401 may be made of a ferromagnetic material (e.g., iron, steel, nickel, cobalt, magnetite, etc.). In an embodiment, the disc 401 may be constructed of a magnet (e.g., a natural magnet, neodymium, alnico, etc.). The disc 401 may include a first surface 414, a second surface 416, and may have a width 418. In an embodiment, the width 418 may be smaller than the opening

402 and larger than the opening 314. In an embodiment, the first surface 414 and second surface 416 may be identical. In such embodiments, the disc 401 may be oriented within the end cap 300 with either the first surface 414 or the second surface 416 resting against the disc mating surface 408. Likewise, depending on the orientation of the disc 401 within the end cap 300, either the first surface 414 or the second surface 416 may be facing the bottom end 304 of the end cap 300. For example, if the disc 401 is positioned within the end cap 300 with the second surface 416 resting against the disc mating surface 408, the second surface 416 may be facing the top end 302 of the end cap 300, and the first surface 414 may be facing the bottom end 304 of the end cap 300.

In an embodiment, when the disc 401 is installed within the end cap 300, the portion of the disc 401 facing the top end 302 of the end cap 300 may be exposed through the opening 314. Accordingly, the exposed portion of the disc 401 may be magnetically engaged with a similarly sized magnetic surface (e.g., the mating surface 118 of the plug 108, mating surface 816 of upper portion 810 (not shown in FIG. 4, see FIG. 8), mating surface 916 of upper portion 910 (not shown in FIG. 4, see FIG. 9), etc.).

In an embodiment, the O-ring 403 may be nylon, rubber, or any other suitable material. When installed, the O-ring 403 may be positioned between the disc 401 and the fishing rod R such that the O-ring 403 is against either the first surface 414 or the second surface 416 the disc 401, depending on the orientation of the disc 401 within the end cap 300.

Figure 5:
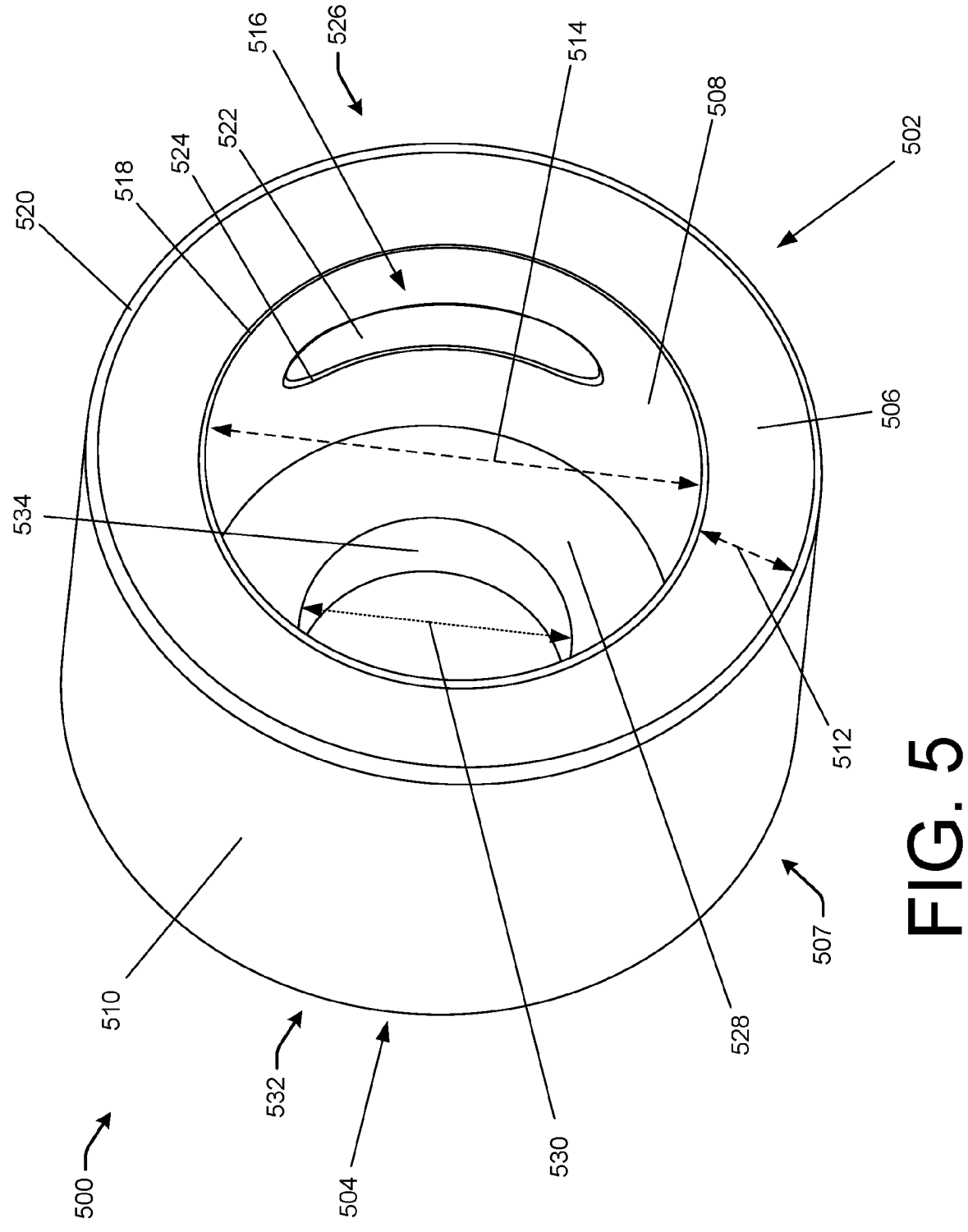
FIG. 5 illustrates a bottom front side view of a rod end cap, according to an embodiment of this disclosure.

FIG. 5 illustrates a top side view of a rod end cap 500 ("universal cap 500"), according to an embodiment of this disclosure. In an embodiment, the universal cap 500 may be installed on a rod (e.g., fishing rod, spinning rod, casting rod, etc.) post-manufacture. For example, the universal cap 500 may be installed on a fishing rod that was manufactured without the end cap 300 or the universal cap 500. The universal cap 500 may be installed on a rod via a fastener (not shown in FIG. 5, see FIG. 7) and a washer (not shown in FIG. 5, see FIG. 7).

In an embodiment, the universal cap 500 may have a top end (e.g., first end, back end, tether end, etc.) 502 and a bottom end (e.g., second end, front end, rod end, etc.) 504 that is opposite the top end 502. The universal cap 500 may include a top surface 506 at the top end 502. The universal cap 500 may have a sidewall 507 that extends from the top end 502 to the bottom end 504. The sidewall 507 may have an inner wall (e.g., first inner wall, upper inner wall, etc.) 508 and an outer wall 510 separated by a wall thickness 512.

The universal cap 500 may have an opening (e.g., top opening, main opening, etc.) 514 through the top surface 506. In an embodiment, the opening 514 may be sized to receive a portion of a magnetic tether (e.g., the plug 108 of the magnetic tether 202, not shown in FIG. 5, see FIG. 2A). The opening 514 may also be sized to receive a portion of the anchor 106. In an embodiment, the universal cap 500 may include a slot 516 that extends through the outer wall 510 and the inner wall 508 (i.e., the depth of slot 516 is the same as the wall thickness 512).

In an embodiment, the inner wall 508 may extend from the bottom end 504 to the top surface 506 at the top end 502. In an embodiment, the inner wall 508 may join with the top surface at inner edge 518. In an embodiment, the inner edge 518 may be an angular transition between the inner wall 508 and the top surface 506. For example, the inner edge 518 may be rounded, chamfered, beveled, etc.

In an embodiment, the outer wall 510 may extend from the bottom end 504 to the top surface 506 at the top end 502.

In an embodiment, the outer wall 510 may join with the top surface 506 at outer edge 520. In an embodiment, the outer edge 520 may be an angular transition between the outer wall 510 and the top surface 506. For example, the outer edge 520 may be rounded, chamfered, beveled, etc.

In an embodiment, the slot 516 may include an inner wall 522 and an inner edge 524. The inner wall 522 of the slot 516 may extend between the inner wall 508 of the universal cap 500 and the outer wall 510 of the universal cap 500. In an embodiment, the inner wall 522 of the slot 516 may join with the inner wall 508 at the inner edge 524 of the slot 516. In an embodiment, the inner edge 524 of the slot 516 may be an angular transition between the inner wall 522 of the slot 516 and the inner wall 508 of the universal cap 500. For example, the inner edge 524 may be rounded, chamfered, beveled, etc.

Additionally, the inner wall 522 of the slot 516 may join with the outer wall 510 at the outer edge 526 (not shown in FIG. 5, see FIG. 6) of the slot 516. In an embodiment, the outer edge 526 of the slot 516 may be an angular transition between the inner wall 522 of the slot 516 and the outer wall 310 of the universal cap 500. For example, the outer edge 526 may be rounded, chamfered, beveled, etc.

In an embodiment, the inner wall 508 may extend from the inner edge 518 at the top end 502 to a tether mating surface 528. The tether mating surface 528 may be constructed of a magnet (e.g., a natural magnet, neodymium, alnico, etc.). In an embodiment, the tether mating surface 528 may be constructed of a ferromagnetic material (e.g., iron, steel, nickel, cobalt, magnetite, etc.).

Figure 6:
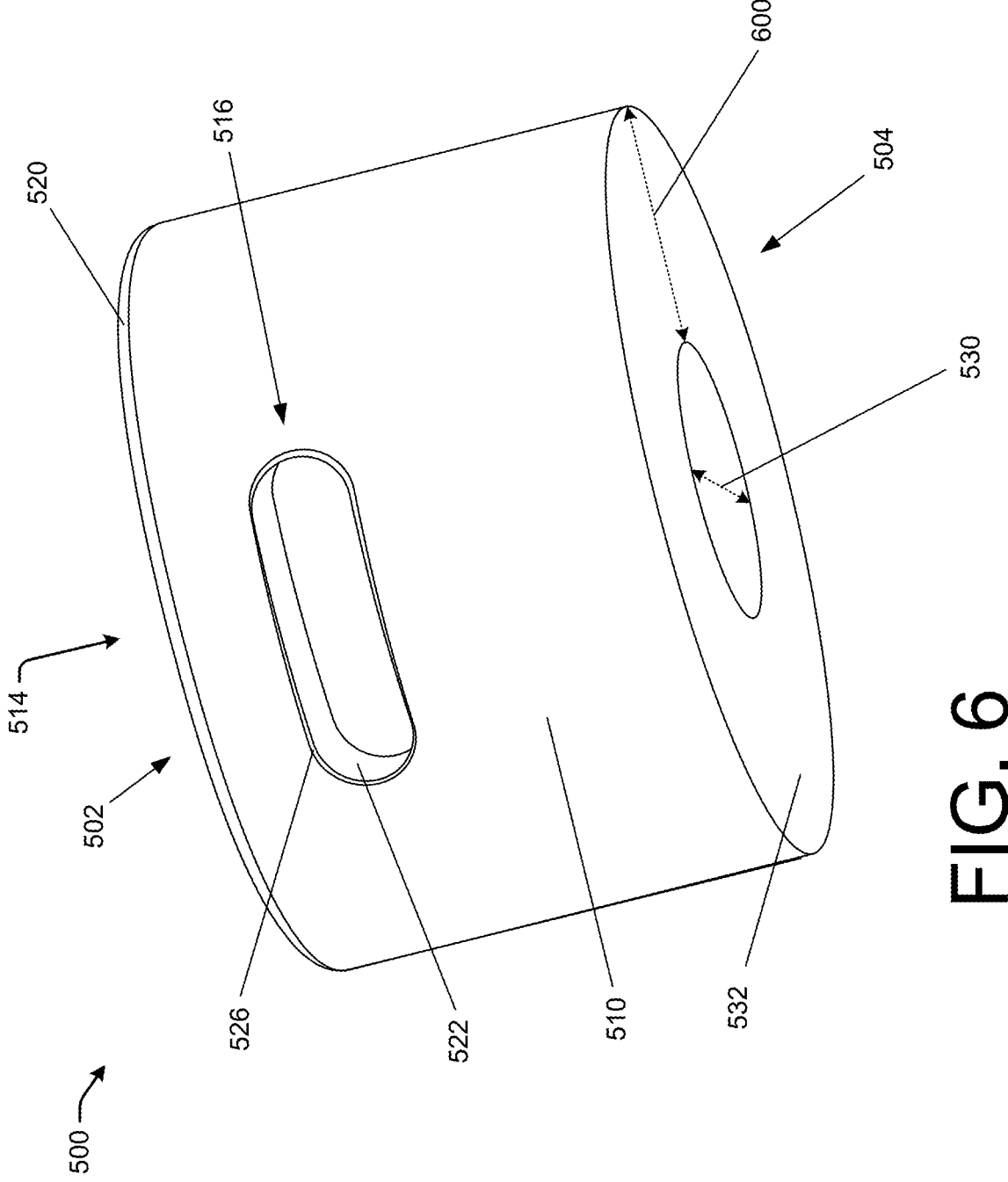
FIG. 6 illustrates a top side view of a rod end cap, according to an embodiment of this disclosure.

In an embodiment the universal cap 500 may include an opening (e.g., bottom opening, second opening, etc.) 530 that extends through the tether mating surface 528 and a mounting surface (e.g., bottom surface) 532 (not shown in FIG. 5, see FIG. 6). In an embodiment, the universal cap 500 may include an inner wall (e.g., second inner wall, lower inner wall, etc.) 534 that extends from the tether mating surface 528 to the bottom surface 532 (not shown in FIG. 5, see FIG. 6). The opening 530 may be configured to receive a fastener (not shown in FIG. 5, see FIG. 7).

FIG. 6 illustrates a bottom front side view of the universal cap 500 of FIG. 5, according to an embodiment of this disclosure. In an embodiment, the bottom surface 532 may extend from the opening 530 to the outer wall 510 at length 600. In an embodiment, the bottom surface 532 may be configured to engage with a washer (not shown in FIG. 6, see FIG. 7).

Figure 7:
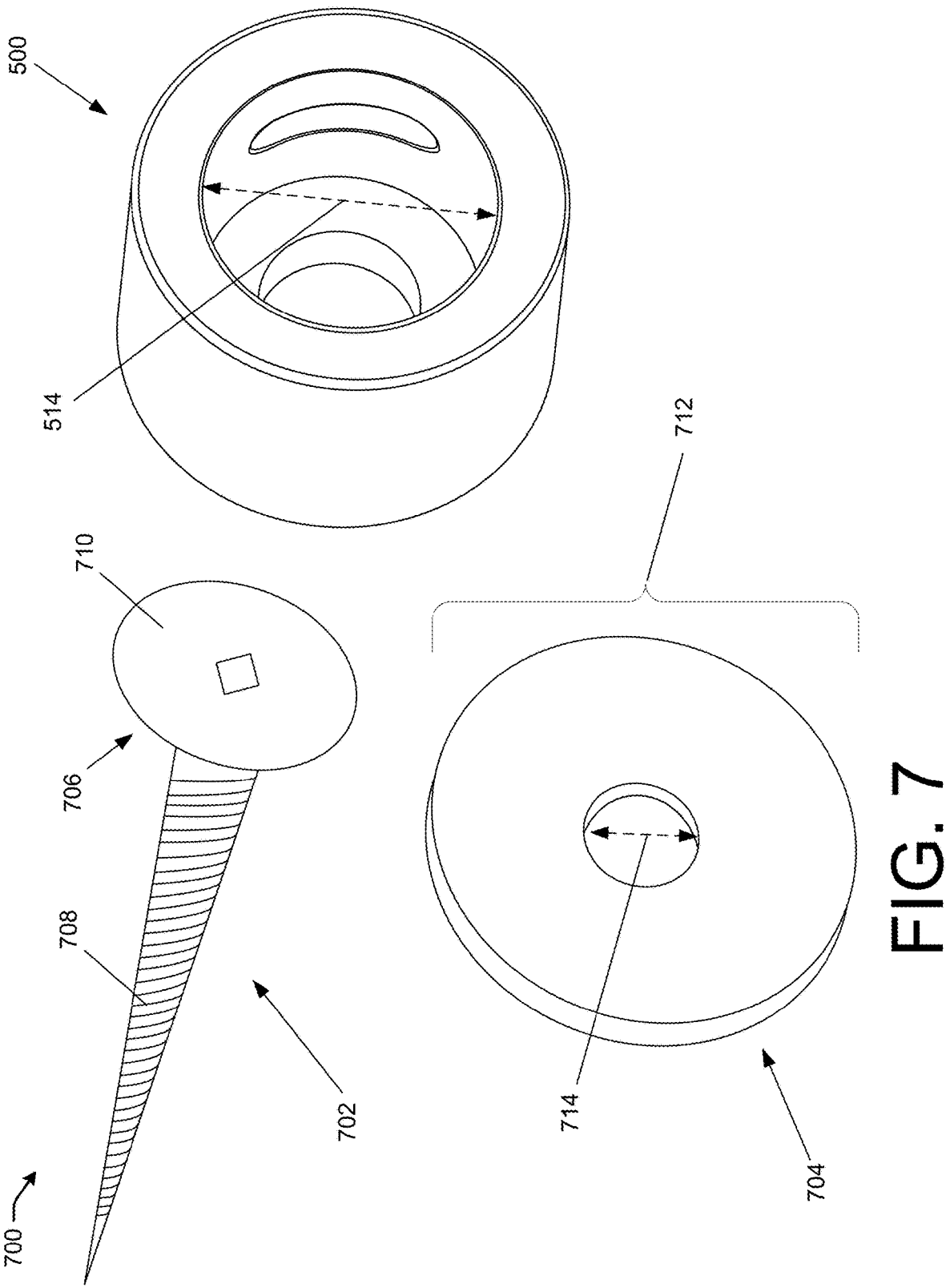
FIG. 7 illustrates a side view of a rod end conversion system, according to an embodiment of this disclosure.

FIG. 7 illustrates a side view of a rod end conversion system 700 ("system 700"), according to an embodiment of this disclosure. In an embodiment, the system 700 may include the universal cap 500 of FIG. 5, a threaded fastener (e.g., screw) 702, and a washer 704. In an embodiment, the screw 702 may include a head 706 and a shank 708. The head 706 may include a surface 710. It is understood that the screw 702 may be a wood screw, sheet metal screw, self-tapping screw, or any other suitable threaded fastener. It is also understood that the length of screw 702 may be any length suitable for the specific application. The screw 702 may be configured to be operated (i.e., rotated) by a cross-tipped screwdriver, flat-tipped screwdriver, torx-tipped screwdriver, hex-head screwdriver, etc., or any other suitable operating tool. In an embodiment, the screw 702 may be constructed of a ferromagnetic material (e.g., iron, steel, nickel, cobalt, magnetite, etc.).

In an embodiment, the washer 704 may have a diameter 712 and include an aperture 714. The washer 704 may be rubber, plastic, nylon, or any other suitable material. In an embodiment, the washer 704 may be oriented between the universal cap 500 and the fishing rod upon which the system 700 is being installed. The aperture 714 may be sized to accommodate the shank 708 of the screw 702.

Figure 7A:
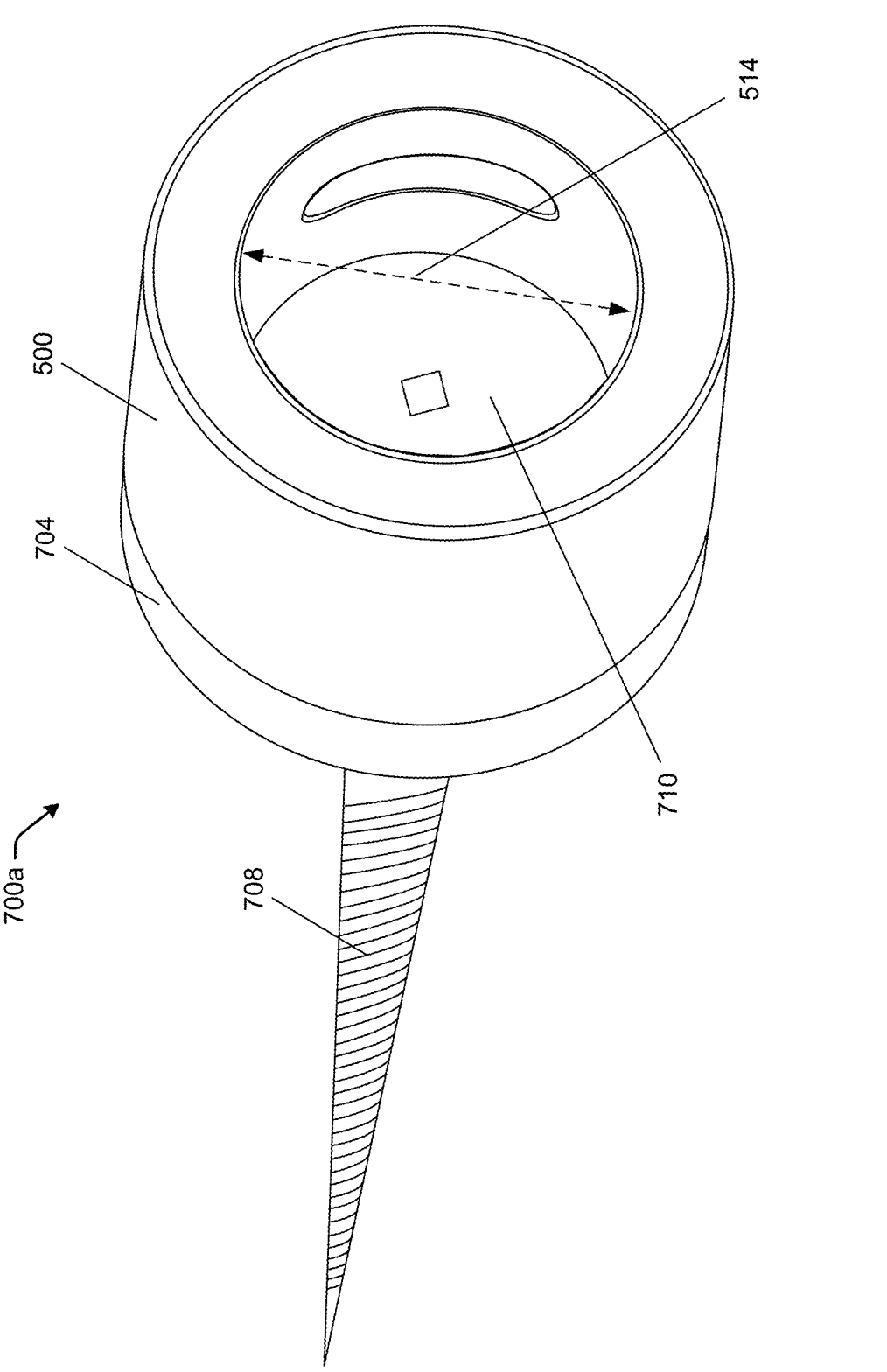
FIG. 7A illustrates a front-side view of an assembled rod end conversion system of FIG. 7, according to an embodiment of this disclosure.

FIG. 7A illustrates a front-side view of an assembled rod end conversion system 700a ("assembled system 700a") of the system 700 of FIG. 7, according to an embodiment of this disclosure. The screw 702 may be disposed through the universal cap 500 and the washer 704. When the screw 702 is installed within the universal cap 500, the surface 710 may be facing the opening 514. Accordingly, the surface 710, when facing the opening 514, may be configured to magnetically engage with a similarly sized magnetic surface (e.g., the mating surface 118 of the plug 108 (not shown in FIG. 7A, see FIG. 1), mating surface 816 of upper portion 810 (not shown in FIG. 7A, see FIG. 8), or mating surface 916 of upper portion 910 (not shown in FIG. 7A, see FIG. 9), etc.).

Figure 8:
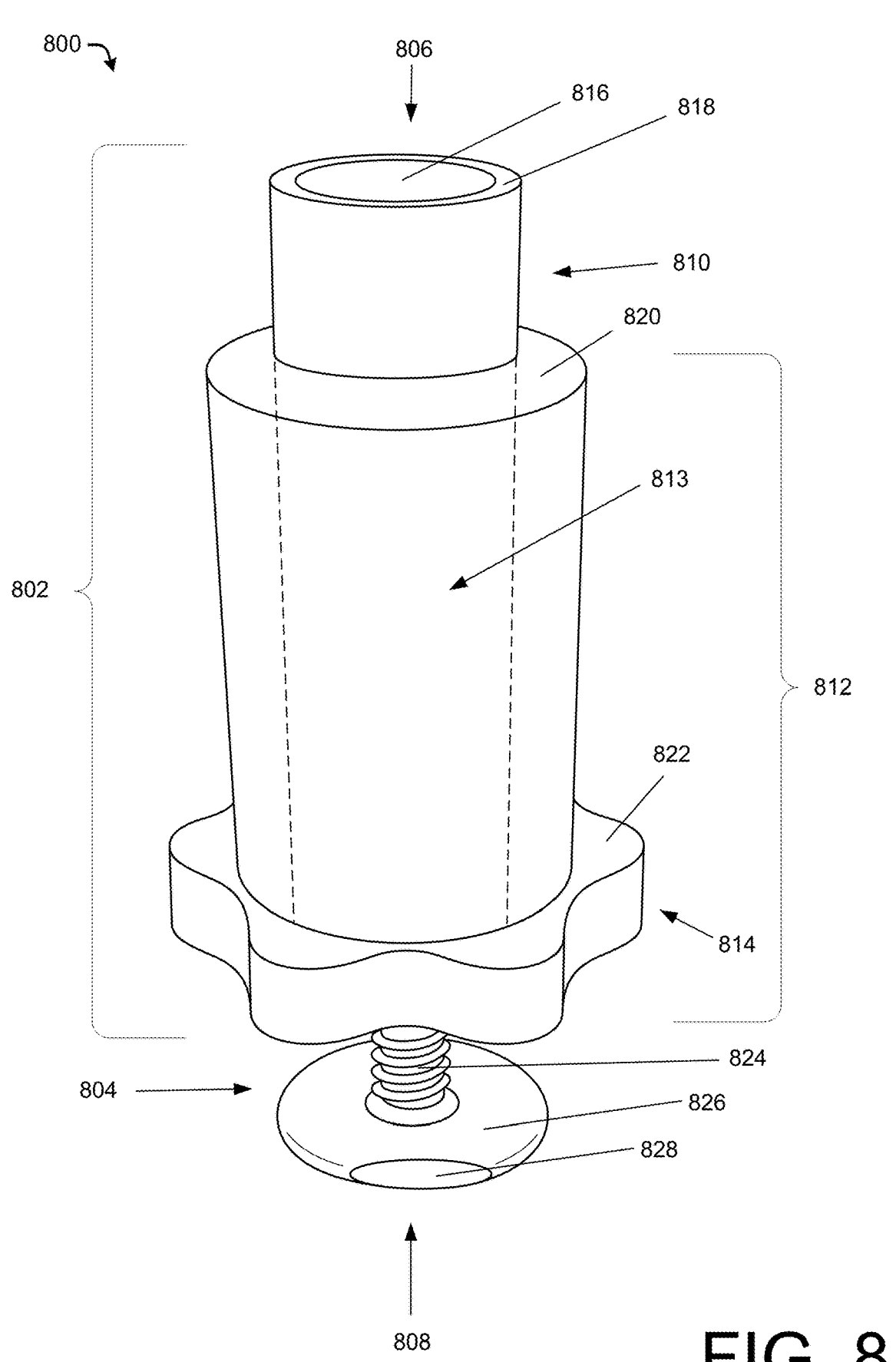
FIG. 8 illustrates a front view of a rod mount, according to an embodiment of this disclosure.

FIG. 8 illustrates a front view of a rod mount 800 ("anchor 800"), according to an embodiment of this disclosure. In an embodiment, the anchor 800 may include a body 802 and a fastener 804. In an embodiment, the anchor 800 may have a top end 806 and a bottom end 808. The body 802 may include an upper portion 810 and a lower portion 812. In an embodiment, the lower portion 812 may include a center portion 813 and a grip portion 814. In an embodiment, the upper portion 810 may be coupled to the center portion 813. In an embodiment, the upper portion 810 may be sized to fit within opening 314 of the end cap 300 (not shown in FIG. 8) and/or the opening 514 of the universal cap 500 (not shown in FIG. 8).

In an embodiment, the upper portion 810 may include a mating surface 816 and a coating 818. The mating surface 816 may be constructed of (or include) a magnet (or magnetic material) (e.g., a natural magnet, neodymium, alnico, etc.). The coating 818 may surround the outer surfaces of the upper portion 810. It is understood that the coating 818 may have one or more colors and/or textures. It is also understood that the coating 818 may be made of plastic, nylon, rubber, or other suitable material or combination of materials.

In an embodiment, the middle portion 812 may include a sleeve 820, the center portion 813, and a grip portion 814. In an embodiment, the sleeve 820 may be configured to fit snuggly against the center portion 813. For example, the sleeve 820 may have a cylinder shape and be sized to surround the center portion 813 of the lower portion 812. The sleeve 820 may be made of foam, rubber, plastic, or any other suitable material. In an embodiment, the sleeve 820 may be adhered (e.g., glued, epoxied, etc.) to the center portion 813. In an embodiment, the grip portion 814 may include a series of lobes 822 radially distributed around the body 802.

In an embodiment, the fastener (e.g., t-nut, etc.) 804 may include a threaded upper portion 824 and a head 826. The head 826 of the fastener 804 may be shaped such that, in a first orientation, the head 826 is accommodated passage through a slot in a mounting rail (not shown), and in a second orientation, the head 826 is prevented from passage through the slot in the rail segment. As shown in FIG. 8, the head may be substantially circular with the exception of two straight sides (i.e., includes two rounded sides and two straight sides). However, it is understood that the head 826 may resemble any shape the provides the first orientation and second orientation described above with respect to the head 826 (e.g., rhomboidal, t-shaped, elliptical, etc.).

In an embodiment, the bottom end 808 of the body 802 may include an aperture (not shown) that is configured to receive the threaded portion 824 of the fastener 804. The body 802 and the fastener 804 may be configured to interact such that relative rotational motion between the body 802 and the fastener 804 may cause the distance between the body 802 and the head 826 to increase or decrease. For example, if the fastener 804 is in a fixed position (e.g., installed within a mounting rail) and unable to rotate freely, the distance between the body 802 and the head 826 of the fastener 804 may decrease when the body 802 is rotated clockwise.

Figure 9:
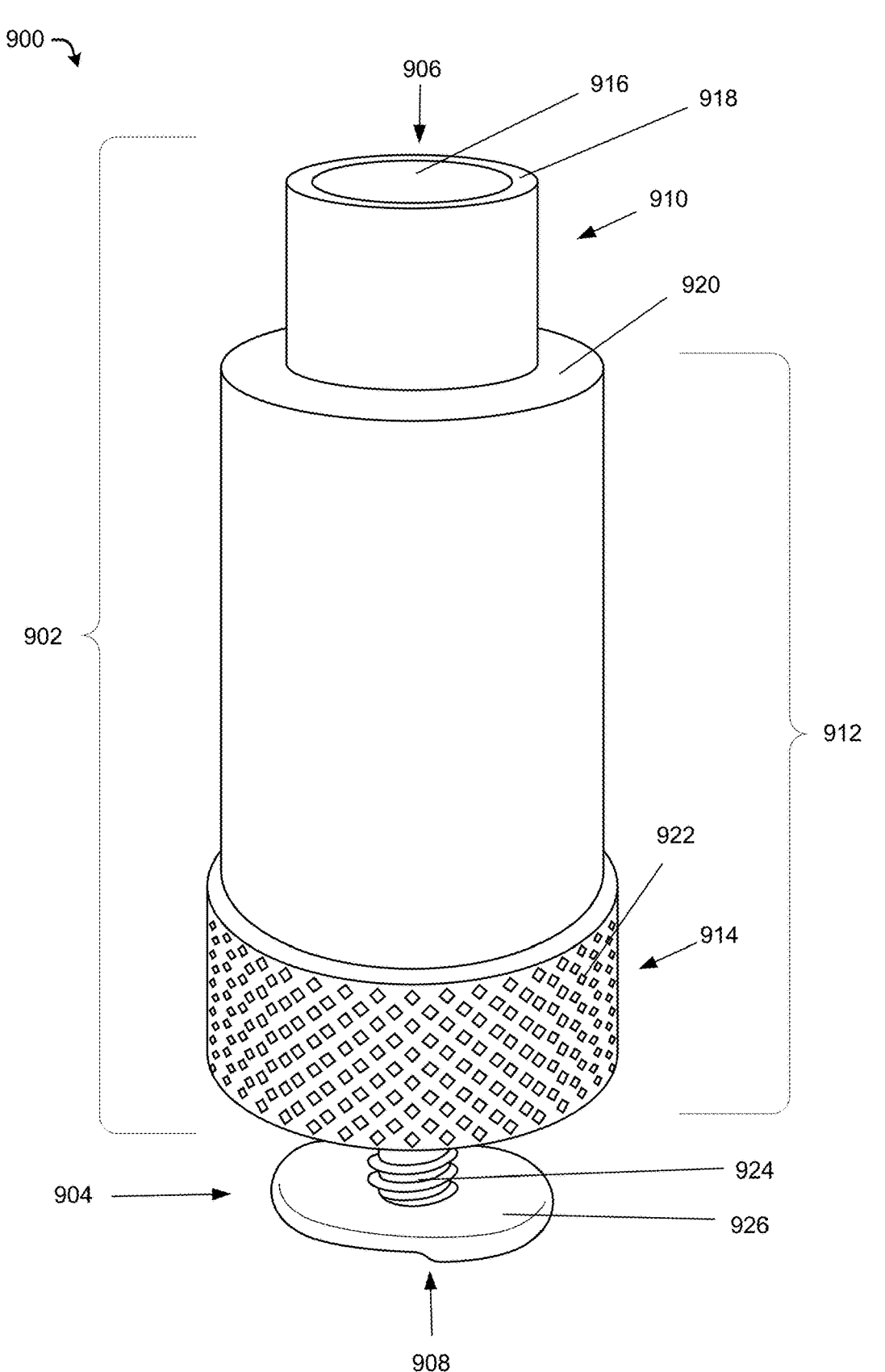
FIG. 9 illustrates a front view of a rod mount, according to an embodiment of this disclosure.

FIG. 9 illustrates a front view of a rod mount 900 ("anchor 900"), according to an embodiment of this disclosure. In an embodiment, the anchor 900 may include a body 902 and a fastener 904. In an embodiment, the anchor 900 may have a top end 906 and a bottom end 908. The body 902 may include an upper portion 910, a lower portion 912. In an embodiment, lower portion 912 may include a grip portion 914. In an embodiment, the upper portion 910 may be sized to fit within opening 314 of the end cap 300 (not shown in FIG. 9) and/or the opening 514 of the universal cap 500 (not shown in FIG. 9).

In an embodiment, the upper portion 910 may include a mating surface 916 and a coating 918. The mating surface 916 may be constructed of a magnet (e.g., a natural magnet, neodymium, alnico, etc.). The coating 918 may surround the outer surfaces of the upper portion 910. It is understood that the coating 918 may have one or more colors and/or textures. It is also understood that the coating 918 may be made of plastic, nylon, rubber, or other suitable material or combination of materials.

In an embodiment, the lower portion 912 may include a barrel 920 and the grip portion 914. In an embodiment, the barrel 920 may have a cylinder shape and be wider than the upper portion 910. The barrel 920 may be made of aluminum (e.g., anodized aluminum) or any other suitable metal or alloy. In an embodiment, the grip portion 914 may be flared out such that the grip portion 914 is wider than the barrel 920.

In an embodiment, the fastener (e.g., t-nut, etc.) 904 may include a threaded upper portion 924 and a head 926. The head 926 of the fastener 904 is shaped such that, in a first orientation, the head 926 is accommodated passage through a slot in a mounting rail (not shown), and in a second orientation, the head 926 is prevented from passage through the slot in the rail segment. As shown in FIG. 9, the head may be substantially elliptical with the exception of two straight sides (i.e., includes two rounded sides and two straight sides). However, it is understood that the head 926 may resemble any shape the provides the first orientation and second orientation described above with respect to the head 926 (e.g., rhomboidal, t-shaped, elliptical, etc.).

In an embodiment, the bottom end 908 of the body 902 may include an aperture (not shown) that is configured to receive the threaded upper portion 924 of the fastener 904. The body 902 and the fastener 904 may be configured to interact such that relative rotational motion between the body 902 and the fastener 904 may cause the distance between the body 902 and the head 926 to increase or decrease. For example, if the fastener 904 is in a fixed position (e.g., installed within a mounting rail) and unable to rotate freely, the distance between the body 902 and the head 926 of the fastener 904 may decrease when the body 902 is rotated clockwise.

Figure 10:
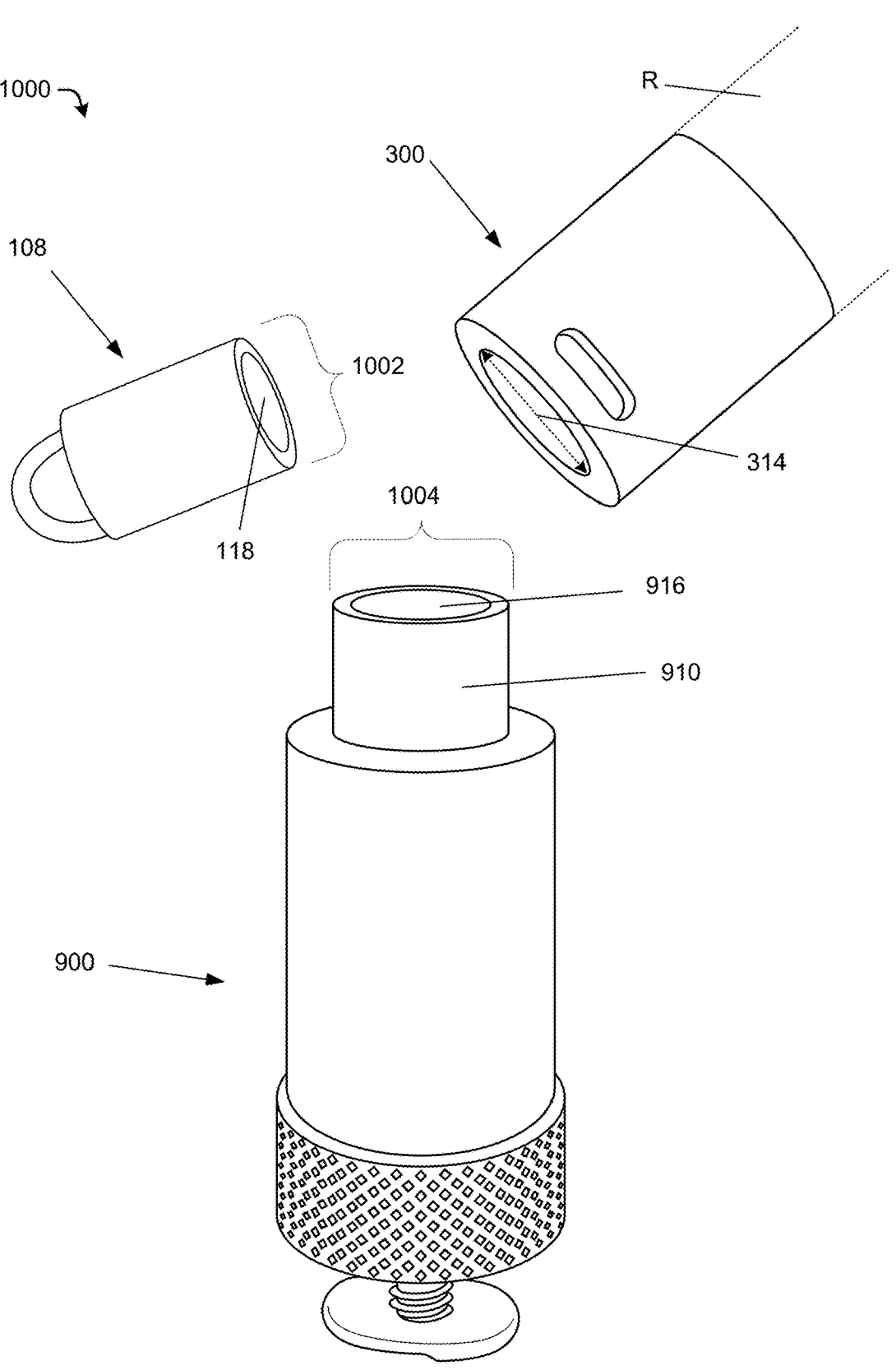
FIG. 10 illustrates a side view of a rod end cap, a magnetic tether, and an anchor, according to an embodiment of this disclosure.

FIG. 10 illustrates a side view 1000 of the end cap 300 of FIG. 3, the plug 108 of FIG. 1, and the anchor 900 of FIG. 9, according to an embodiment of this disclosure. In an embodiment, the plug 108 may have a width 1002. In an embodiment, the width of the upper portion 910 of the anchor 900 may have a width 1004. In an embodiment, the opening 314 may be sized to accommodate the width 1002 and/or width 1004.

In an embodiment, the mating surface 118 may be magnetic. In an embodiment, the mating surface 118 may be configured to magnetically couple with the end cap 300 (i.e., the first surface 414 or the second surface 416 of the disc 401 within the end cap 300).

In an embodiment, the mating surface 916 may be magnetic. In an embodiment, the mating surface 916 may be configured to magnetically couple with the end cap 300 (i.e., the first surface 414 or the second surface 416 of the disc 401 within the end cap 300).

Figure 11:
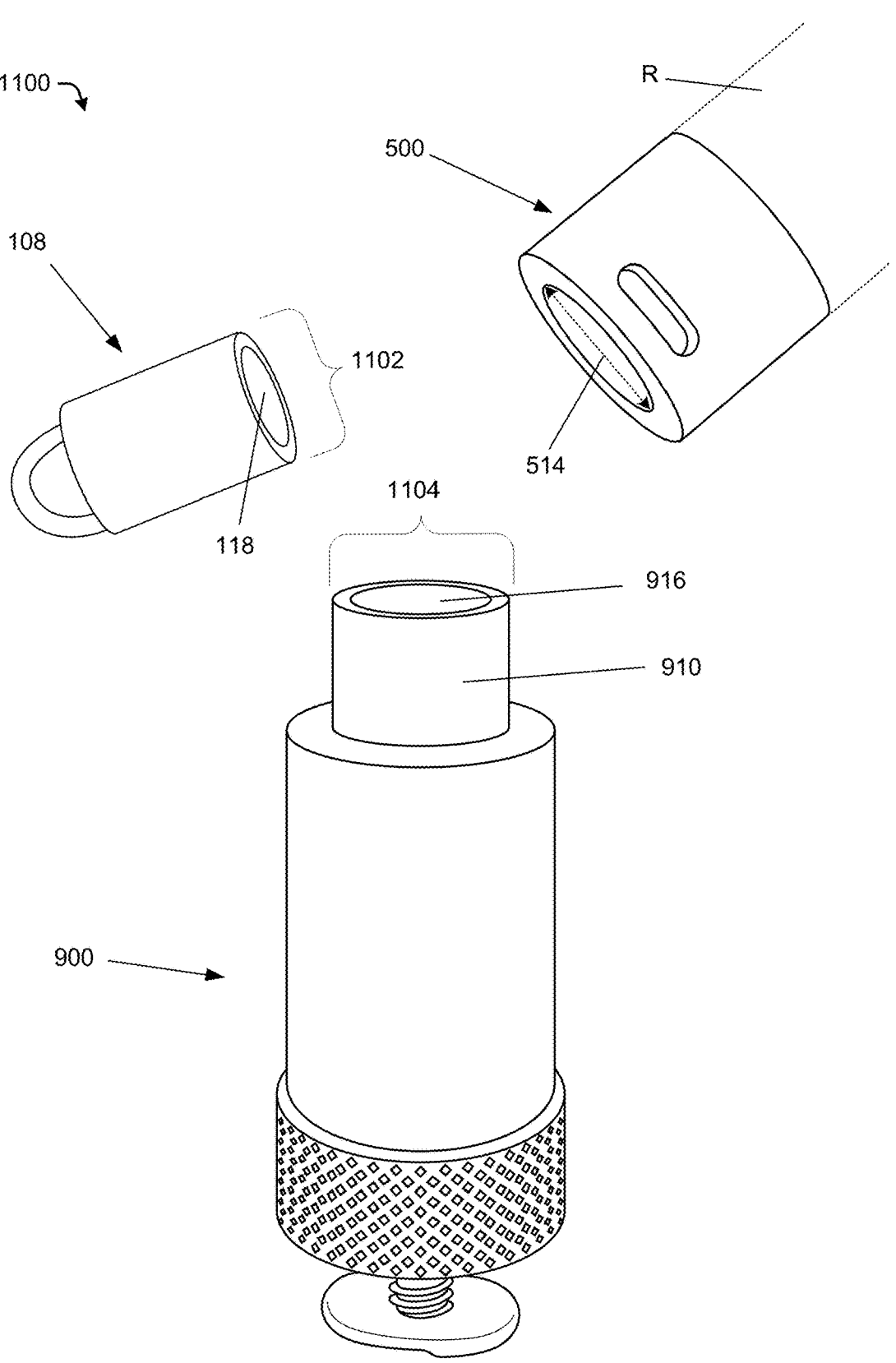
FIG. 11 illustrates a side view of a rod end cap, a magnetic tether, and an anchor, according to an embodiment of this disclosure.

FIG. 11 illustrates a side view 1100 of the assembled system 700a of FIG. 700A, the plug 108 of FIG. 1 installed on a fishing rod R, and the anchor 900 of FIG. 9, according to an embodiment of this disclosure. In an embodiment, the plug 108 may have a width 1102. In an embodiment, the width of the upper portion 910 of the anchor 900 may have a width 1104. In an embodiment, the opening 514 may be sized to accommodate the width 1102 and/or width 1104.

In an embodiment, the mating surface 118 may be magnetic. In an embodiment, the mating surface 118 may be configured to magnetically couple with the universal cap 500 (i.e., the surface 710 screw 702 within the universal cap 500).

In an embodiment, the mating surface 916 may be magnetic. In an embodiment, the mating surface 916 may be configured to magnetically couple with the universal cap 500 (i.e., the surface 710 screw 702 within the universal cap 500). Additionally, in an embodiment, the fastener is connected to the body such that, via rotational movement of the fastener within the body, a tension of the rod mount relative to the mounting rail is adjustable to secure the rod mount to the mounting rail.

Although several embodiments have been described in language specific to structural features and/or methodological acts, it is to be understood that the claims are not necessarily limited to the specific features or acts described. Rather, the specific features and acts are disclosed as illustrative forms of implementing the claimed subject matter.

The above detailed description of embodiments of the present technology are not intended to be exhaustive or to limit the technology to the precise forms disclosed above. Although specific embodiments of, and examples for, the technology are described above for illustrative purposes, various equivalent modifications are possible within the scope of the technology, as those skilled in the relevant art will recognize. For example, although steps may be presented in a given order, in other embodiments, the steps may be performed in a different order. The various embodiments described herein may also be combined to provide further embodiments.

From the foregoing, it will be appreciated that specific embodiments of the technology have been described herein for purposes of illustration, but well-known structures and functions have not been shown or described in detail to avoid unnecessarily obscuring the description of the embodiments of the technology. Where the context permits, singular or plural terms may also include the plural or singular term, respectively.

As used herein, the phrase "and/or" as in "A and/or B" refers to A alone, B alone, or A and B. Additionally, the term "comprising" is used throughout to mean including at least the recited feature(s) such that any greater number of the same feature and/or additional types of other features are not precluded. It will also be appreciated that specific embodiments have been described herein for purposes of illustration, but that various modifications may be made without deviating from the technology. Further, while advantages associated with some embodiments of the technology have been described in the context of those embodiments, other embodiments may also exhibit such advantages, and not all embodiments need necessarily exhibit such advantages to fall within the scope of the technology. Accordingly, the disclosure and associated technology can encompass other embodiments not expressly shown or described herein.

What is claimed is:

1. A magnetic tethering apparatus comprising:
an end cap including:
a first opening at a first end of the end cap,
an outer wall extending from the first end to a second end of the end cap in a first direction,
a second opening at the second end of the end cap,
a first mounting surface at the second end of the end cap adjacent to the second opening, the first mounting surface configured to engage with a second mounting surface,
an inner wall extending from the second end of the end cap towards the first opening in a second direction, and
a base wall surface facing the second opening extending radially from the inner wall to the outer wall in a third direction transverse to the first direction;
a disc disposed within the second opening, the disc including:
a first surface disposed against the base wall surface, and
a second surface opposite the first surface; and
an O-ring disposed within the second opening against the second surface of the disc.

2. The magnetic tethering apparatus of claim 1, wherein the second mounting surface includes fishing equipment.

3. The magnetic tethering apparatus of claim 2, wherein the fishing equipment includes a fishing rod.

4. The magnetic tethering apparatus of claim 1, wherein the first opening is sized to receive an anchoring mechanism.

5. The magnetic tethering apparatus of claim 4, wherein the end cap is configured to magnetically couple to the anchoring mechanism.

6. A magnetic tethering system, comprising:
an anchoring mechanism;
an end cap configured to magnetically couple to the anchoring mechanism, the end cap including:
a first opening at a first end of the end cap,
a second opening at a second end of the end cap,
an outer wall extending from the first end to the second end of the end cap in a first direction,
a mounting surface at the second end of the end cap adjacent to the second opening, the mounting surface configured to engage with fishing equipment,
an inner wall extending from the second end of the end cap towards the first opening in a second direction, and
a base wall surface facing the second opening extending radially from the inner wall to the outer wall in a third direction transverse to the first direction;
a disc disposed within the second opening, the disc including:
a first surface coupled with the base wall surface, and
a second surface opposite the first surface oriented to face the second opening; and
an O-ring disposed within the second opening and oriented to engage with the second surface of the disc.

7. The magnetic tethering system of claim 6, wherein the fishing equipment includes a fishing rod.

8. The magnetic tethering system of claim 6, wherein the anchoring mechanism includes a magnetic mating surface configured to be disposed within the end cap.

9. The magnetic tethering system of claim 6, wherein the anchoring mechanism includes a tether configured to magnetically couple with the end cap.

* * * * *